US012094638B2

(12) United States Patent
Asai et al.

(10) Patent No.: US 12,094,638 B2
(45) Date of Patent: Sep. 17, 2024

(54) COIL COMPONENT

(71) Applicant: TDK Corporation, Tokyo (JP)

(72) Inventors: Yugo Asai, Tokyo (JP); Aoi Tokiwa, Tokyo (JP); Daisuke Urabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 826 days.

(21) Appl. No.: 17/189,824

(22) Filed: Mar. 2, 2021

(65) Prior Publication Data

US 2021/0280356 A1 Sep. 9, 2021

(30) Foreign Application Priority Data

Mar. 3, 2020 (JP) ................................ 2020-035711

(51) Int. Cl.
*H01F 27/28* (2006.01)
*H01F 27/26* (2006.01)

(52) U.S. Cl.
CPC ......... *H01F 27/2823* (2013.01); *H01F 27/26* (2013.01)

(58) Field of Classification Search
CPC ..... H01F 27/2823; H01F 27/26; H01F 17/045
See application file for complete search history.

(56) References Cited

U.S. PATENT DOCUMENTS 3,585,553 A * 6/1971 Muckelroy ............... H01F 5/04 336/208
6,157,283 A 12/2000 Tsunemi
6,348,850 B1 * 2/2002 Kimura ................. H01F 17/045 336/200
6,373,366 B1 * 4/2002 Sato ...................... H01F 27/292 336/200
6,535,095 B2 * 3/2003 Aoki ..................... H01F 27/027 336/200
D831,570 S * 10/2018 Takagi ......................... D13/117
2006/0267719 A1 * 11/2006 Yasuda ................. H01F 17/045 336/223
2010/0194517 A1 * 8/2010 Karasek ................ H01F 17/045 336/221
2017/0025212 A1 * 1/2017 Jerez ....................... H01F 27/29
(Continued)

FOREIGN PATENT DOCUMENTS

CN 107453042 A 12/2017
JP 2003-077730 A 3/2003
(Continued)

*Primary Examiner* — Malcolm Barnes
(74) *Attorney, Agent, or Firm* — Rimon P.C.

(57) ABSTRACT

Disclosed herein is a coil component that includes: a drum-shaped core including first and second flange parts and a winding core part; first terminal electrodes provided on the first flange part; second terminal electrodes provided on the second flange part; a plurality of wires wound around the winding core part, each of the plurality of wires having a first end connected to an associated one of the first terminal electrodes, and having a second end connected to an associated one of the second terminal electrodes; and a plate-like core fixed to the first and second flange parts. Each of the first and second flange parts has a first groove formed in a surface facing the plate-like core. The plurality of wires are positioned in parallel to each other in each of the first grooves formed in the first and second flange parts.

19 Claims, 9 Drawing Sheets

(56) References Cited

U.S. PATENT DOCUMENTS

| | | | | |
|---|---|---|---|---|
| 2017/0053726 | A1* | 2/2017 | Takagi | H05K 1/111 |
| 2018/0130597 | A1* | 5/2018 | Komaya | H01F 17/045 |
| 2018/0211756 | A1* | 7/2018 | Kuo | H01F 27/29 |
| 2018/0261379 | A1 | 9/2018 | Igarashi | |
| 2019/0172630 | A1 | 6/2019 | Asai et al. | |
| 2019/0318865 | A1 | 10/2019 | Mikogami et al. | |

FOREIGN PATENT DOCUMENTS

| | | | | |
|---|---|---|---|---|
| JP | 2003077730 | A | * | 3/2003 |
| JP | 2005-056934 | A | | 3/2005 |
| JP | 2009-206352 | A | | 9/2009 |
| JP | 2009206352 | A | * | 9/2009 |
| JP | 2010010354 | A | * | 1/2010 |
| JP | 2011-119379 | A | | 6/2011 |
| JP | 2017-168538 | A | | 9/2017 |
| JP | 2018-148081 | A | | 9/2018 |

* cited by examiner

COIL COMPONENT

BACKGROUND OF THE INVENTION

Field of the Invention

The present invention relates to a coil component and, more particularly, to a coil component using a drum-shaped core.

Description of Related Art

As a coil component using a drum-shaped core, a coil component described in JP 2018-148081A is known. The coil component described in JP 2018-148081A has two wires wound around a winding core part of a drum-shaped core thereof, and one end of each of the two wires is connected to a terminal electrode provided on one flange part, and the other end thereof is connected to a terminal electrode provided on the other flange part.

In the coil component described in JP 2018-148081A, the vicinities of the end portions of the two wires are significantly separated, so that, when this coil component is used as a common mode choke coil, a large variation disadvantageously occurs in characteristics such as an S parameter. To solve such a disadvantage, there can be conceived a method of forming a groove in the flange part and accommodating a wire in the formed groove; even in this case, a variation in characteristics such as an S parameter cannot be sufficiently reduced depending on the shape or size of the groove.

SUMMARY

It is therefore an object of the present invention to provide a coil component having a configuration in which a plurality of wires are wound around a drum-shaped core, capable of sufficiently reducing a variation in characteristics such as an S parameter.

A coil component according to the present invention includes: a drum-shaped core including a first flange part, a second flange part, and a winding core part positioned between the first and second flange parts; a plurality of terminal electrodes provided on the first flange part; a plurality of terminal electrodes provided on the second flange part; a plurality of wires wound around the winding core part, having one end connected to one of the plurality of terminal electrodes provided on the first flange part, and having the other end connected to one of the plurality of terminal electrodes provided on the second flange part; and a plate-like core fixed to the first and second flange parts. The first and second flange parts each have a groove formed in the surface facing the plate-like core, and the plurality of wires are positioned in parallel to each other in each of the grooves formed in the first and second flange parts.

According to the present invention, the plurality of wires are positioned in parallel to each other in each groove, so that it is possible to reduce a variation in characteristics such as an S parameter due to shift of the wires in each groove. In addition, the groove formed in each of the flange parts is closed from above by the plate-like core, thereby preventing coming-off of the wires.

In the present invention, the plate-like core may have a groove at a position overlapping the grooves formed in the respective first and second flange parts. Thus, even when the cross-sectional size of the groove formed in each of the first and second flange parts is designed small, interference between the wires and the plate-like core can be prevented.

In the present invention, the space factor of the plurality of wires in the groove formed in each of the first and second flange parts may be 60% or more. This can suppress a reduction in volume of the drum-shaped core due to the presence of the grooves, making it possible to obtain high magnetic characteristics.

In the present invention, the plurality of wires include first and second wires, the grooves formed in the respective first and second flange parts include a first groove for accommodating the first wire and a second groove for accommodating the second wire, the first and second grooves extend in parallel to each other, whereby the first and second wires are positioned in parallel to each other. This prevents the plurality of wires from interfering with each other in each groove.

In the present invention, side surfaces of the groove formed in each of the first and second flange parts may be inclined so as to be close to each other to taper the groove. This facilitates accommodation of the wires in each groove in the manufacturing of the coil component, thereby improving working efficiency. In addition, the tapered shape of each groove enhances the effect of the positioning of the wires in each groove.

As described above, according to the present invention, there can be provided a coil component having a configuration in which a plurality of wires are wound around a drum-shaped core, capable of sufficiently reducing a variation in characteristics such as an S parameter.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

Preferred embodiments of the present invention will be explained below in detail with reference to the accompanying drawings.

First Embodiment

Figure 1:
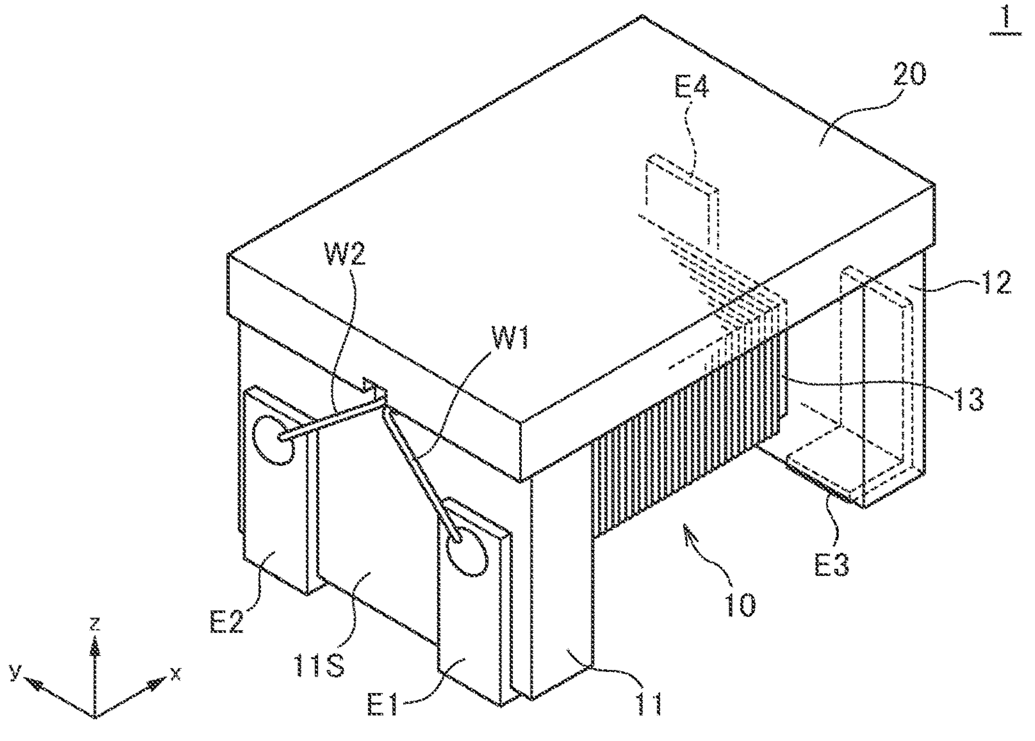
FIGS. 1 and 2 are schematic perspective views illustrating the outer appearance of a coil component 1 according to a first embodiment of the present invention.
Figure 2:
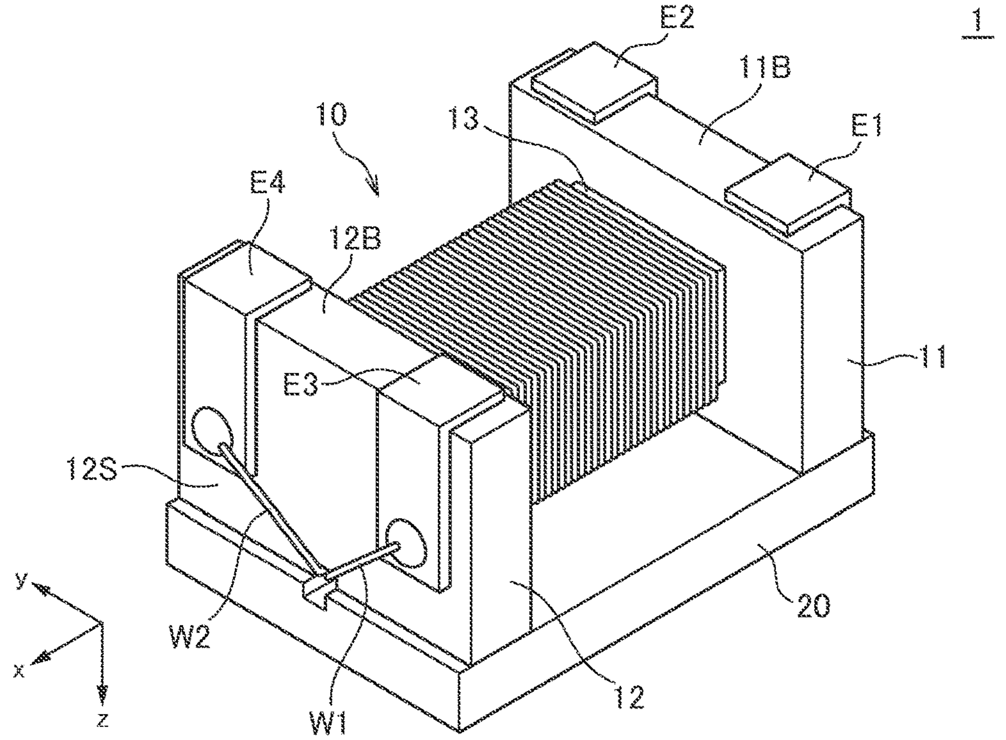

FIGS. 1 and 2 are schematic perspective views illustrating the outer appearance of a coil component 1 according to a first embodiment of the present invention.

The coil component 1 according to the present embodiment is a common mode choke coil and includes, as illustrated in FIGS. 1 and 2, a drum-shaped core 10, a plate-like core 20, terminal electrodes E1 to E4, and wires W1 and W2. As a material for the drum-shaped core 10 and plate-like core 20, a magnetic material having a high permeability such as ferrite is used. The same magnetic material or different magnetic materials may be used for the drum-shaped core 10 and the plate-like core 20, and the magnetic material preferably has a permeability μ of 10 to 4000 H/m.

Figure 3:
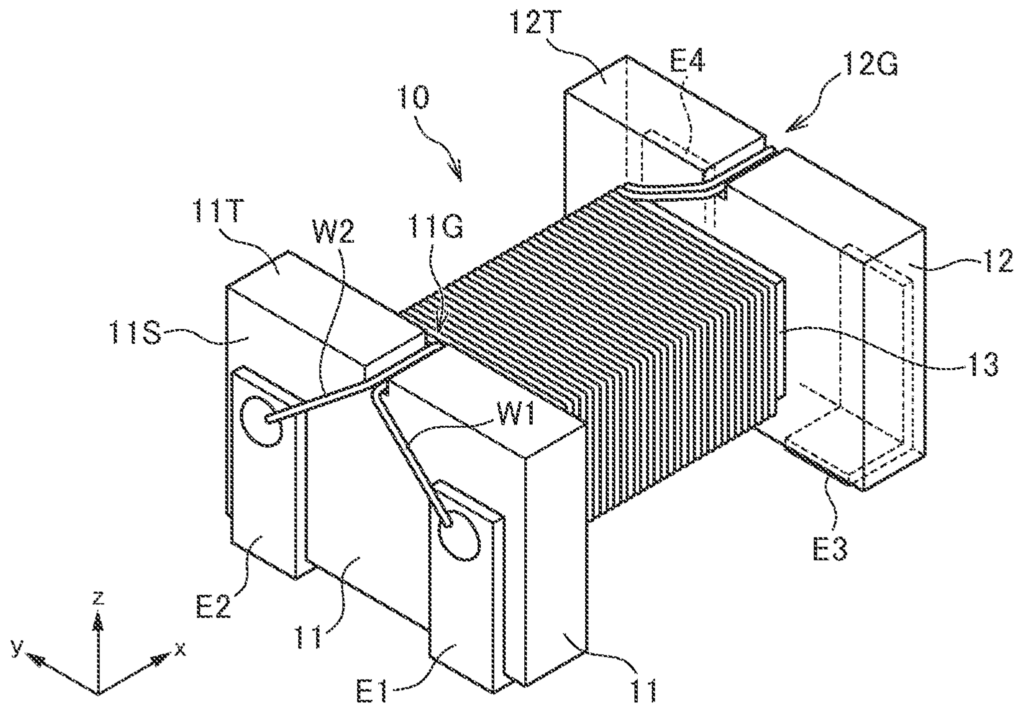
FIG. 3 is a schematic perspective view illustrating a state where the plate-like core 20 is removed from the coil component 1.

FIG. 3 is a schematic perspective view illustrating a state where the plate-like core 20 is removed from the coil component 1.

As illustrated in FIGS. 1 to 3, the drum-shaped core 10 includes a winding core part 13 with its axis directed in the x-direction, a flange part 11 provided on one end of the winding core part 13 in the x-direction, and a flange part 12 provided on the other end of the winding core part 13 in the x-direction. The terminal electrodes E1 and E2 are provided on the flange part 11 and arranged in the y-direction in this order. The terminal electrodes E3 and E4 are provided on the flange part 12 and arranged in the y-direction in this order. The terminal electrodes E1 to E4 are each, for example, a terminal fitting. The wires W1 and W2 are wound around the winding core part 13. One ends of the wires W1 and W2 are connected to the terminal electrodes E1 and E2, respectively, and the other ends thereof are connected to the terminal electrodes E3 and E4, respectively. The number of turns of the wires W1 and W2 and the winding direction thereof are the same as each other. The wires W1 and W2 are the same in the number of turns and winding direction.

The flange parts 11 and 12 of the drum-shaped core 10 have outer surfaces 11S and 12S constituting the yz plane, bottom surfaces 11B and 12B constituting the xy plane and facing a circuit board upon actual use, and top surfaces 11T and 12T constituting the xy plane and facing the plate-like core 20. The terminal electrodes E1 and E2 each have an L-shape formed over the outer surface 11S and bottom surface 11B of the flange part 11, and the terminal electrodes E3 and E4 each have an L-shape formed over the outer surface 12S and bottom surface 12B of the flange part 12. The one ends of the wires W1 and W2 are connected respectively to parts of the terminal electrodes E1 and E2 that cover the outer surface 11S, and the other ends of the wires W1 and W2 are connected respectively to parts of the terminal electrodes E3 and E4 that cover the outer surface 12S. The connection of each of the wires W1 and W2 can be done through, e.g. welding.

As illustrated in FIG. 3, a groove 11G is formed in the top surface 11T of the flange part 11 so as to extend in the x-direction, and a groove 12G is formed in the upper surface 12T of the flange part 12 so as to extend in the x-direction. Leading portions of the wires W1 and W2 positioned between the winding core part 13 and the terminal electrodes E1, E2 are accommodated in the groove 11G, and leading portions of the wires W1 and W2 positioned between the winding core part 13 and the terminal electrodes E3, E4 are accommodated in the groove G12. This allows the wires W1 and W2 to extend along each other not only at parts thereof that are wound around the winding core part 13 but also the leading portions, thereby reducing a variation in characteristics such as an S parameter.

Figure 4:
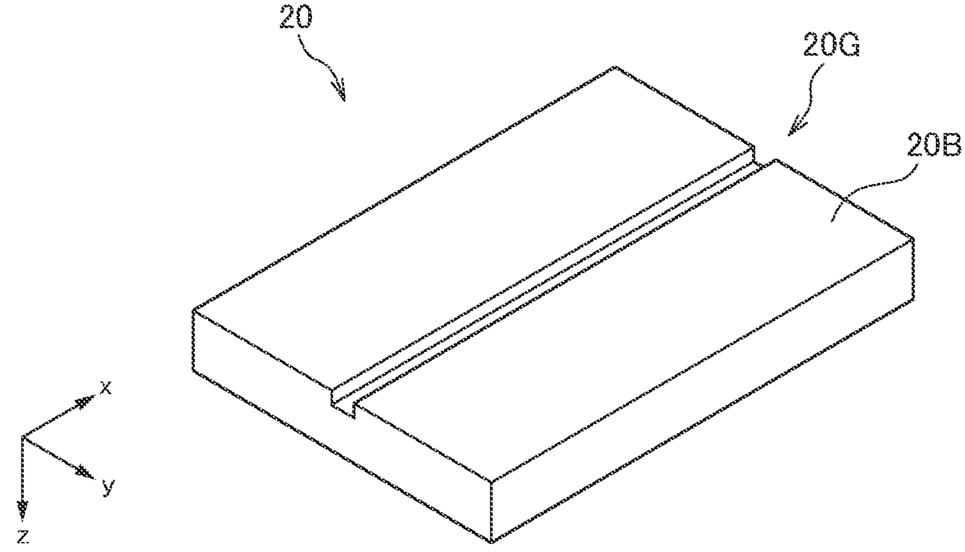
FIG. 4 is a schematic perspective view illustrating the outer appearance of the plate-like core 20.

FIG. 4 is a schematic perspective view illustrating the outer appearance of the plate-like core 20.

As illustrated in FIG. 4, a groove 20G is formed in a surface 20B of the plate-like core 20 so as to extend in the x-direction. The surface 20B of the plate-like core 20 faces the top surfaces 11T and 12T of the flange parts 11 and 12, and the groove 20G overlaps the grooves 11G and 12G. Although the groove 20G is formed over the entire length of the plate-like core 20 in the x-direction in the example of FIG. 4, the groove 20G may be omitted at substantially the center portion in the x-direction. In this case, the volume of the plate-like core 20 increases, leading to an improvement in magnetic characteristics. However, in view of ease of the manufacture of the plate-like core 20, the groove 20G is preferably formed over the entire length of the plate-like core 20 in the x-direction as illustrated in FIG. 4.

Figure 5:
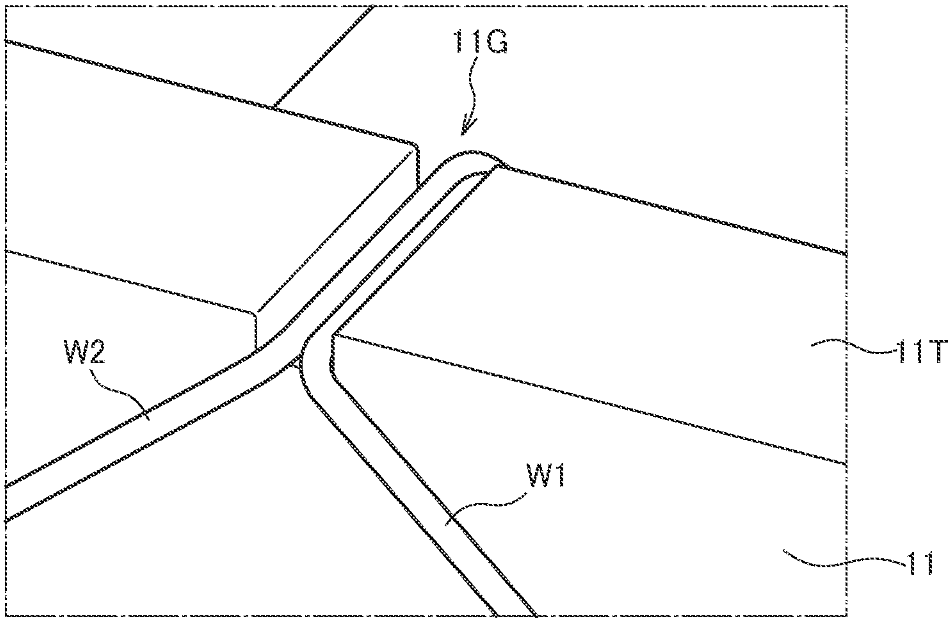
FIG. 5 is a schematic perspective view illustrating the groove 11G in an enlarged manner.
Figure 6:
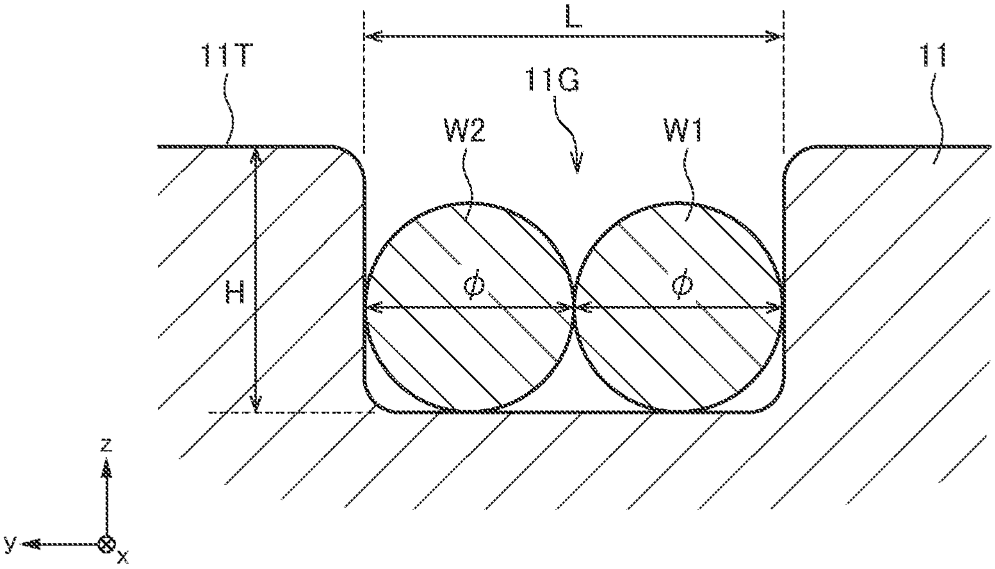
FIG. 6 is a schematic cross-sectional view for explaining the position of the wires W1 and W2 in the groove 11G.

FIG. 5 is a schematic perspective view illustrating the groove 11G in an enlarged manner, and FIG. 6 is a schematic cross-sectional view for explaining the position of the wires W1 and W2 in the groove 11G.

As illustrated in FIG. 5, the two wires W1 and W2 extending in the x-direction are accommodated in parallel in the groove 11G. The shape and size of the groove 11G are designed so as to position the wires W1 and W2 in parallel to each other in the groove 11G as illustrated in FIG. 6. In the example of FIG. 6, a width L of the groove 11G in the y-direction is designed to be twice or slightly larger than a diameter ϕ of each of the wires W1 and W2. Thus, when the wires W1 and W2 are accommodated in the groove 11G, they are positioned in parallel to each other in the groove 11G. The depth H of the groove 11G is designed larger than the diameter ϕ of the wires W1 and W2. When the depth H of the groove G is excessively large, the volume of the drum-shaped core 10 reduces accordingly, so that the depth H is preferably 1.5 times or more and 3 times or less the diameter ϕ.

Figure 7:
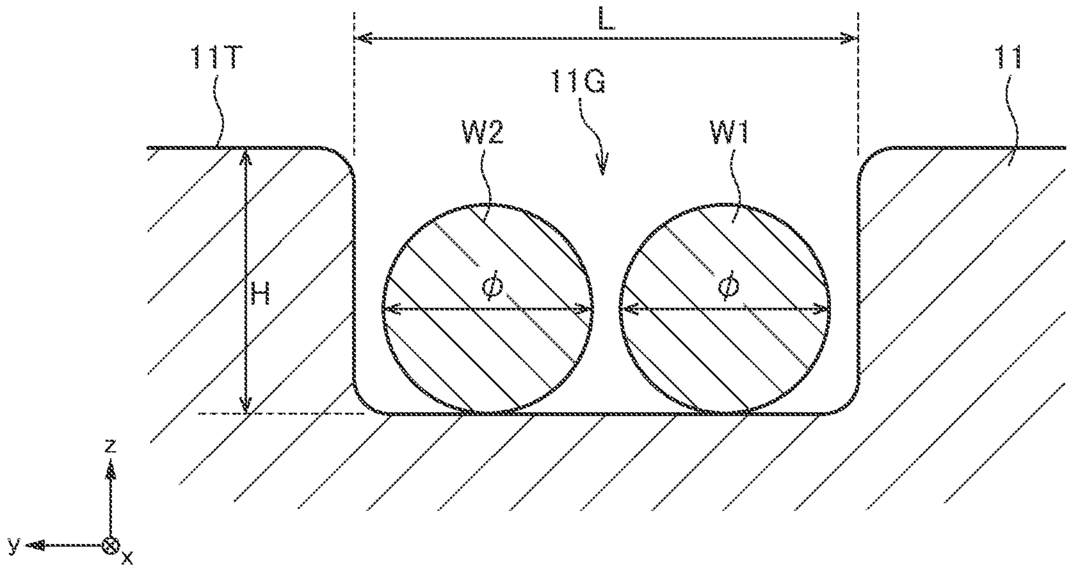
FIG. 7 is a schematic cross-sectional view for indicating an example in which a width L of the groove 11G is enlarged.

However, when the width L of the groove 11G in the y-direction is designed to be just twice the diameter ϕ of each of the wires W1 and W2, the two wires W1 and W2 may fail to be accommodated properly in the groove 11G due to manufacturing variation. In view of this, as illustrated in FIG. 7, the width L of the groove 11G in the y-direction is preferably designed slightly larger than two times of the diameter ϕ of each of the wires W1 and W2. In this case, when the width L is excessively large, the wires W1 and W2 may fail to be positioned properly, which may in turn cause the wires to shift in the groove 11G. Therefore, the width L is preferably designed less than four times of the diameter ϕ. Within the above range, the wires W1 and W2 can be kept substantially parallel to each other in the groove 11G.

The space factor of the wires W1 and W2 in the groove 11G is preferably 60% or more. In other words, the cross section of the groove 11G is preferably designed sufficiently small such that the residual space in the groove 11G is less than 40%. This can suppress a reduction in volume of the drum-shaped core 10 due to the presence of the groove 11G, making it possible to obtain high magnetic characteristics.

Figure 8:
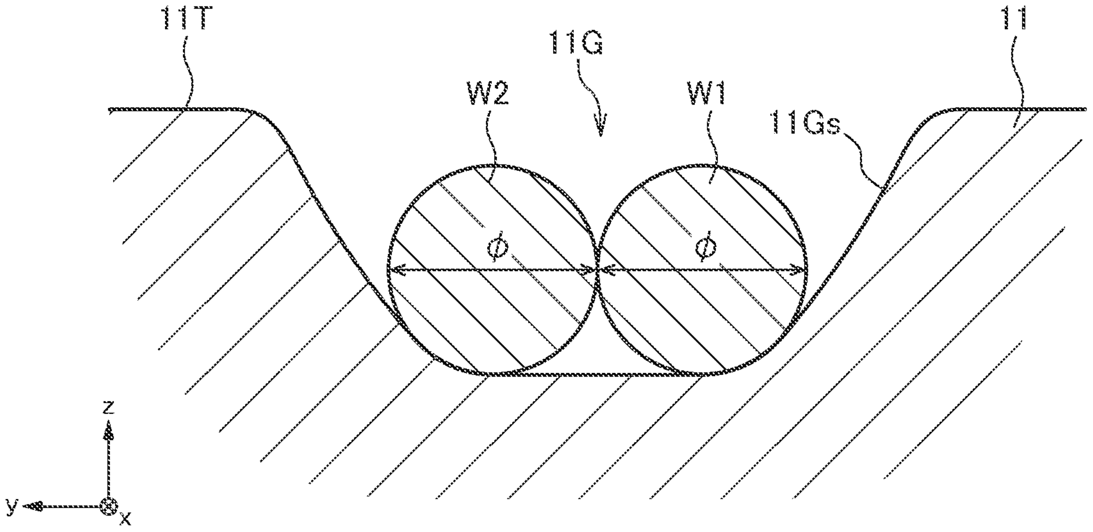
FIG. 8 is a schematic cross-sectional view illustrating a shape of the groove 11G according to a first modification.

Further, as in a first modification illustrated in FIG. 8, side surfaces 11Gs of the groove 11G may be inclined so as to be close to each other to taper the groove 11G in the depth direction. This widens the opening width of the groove 11G, facilitating the accommodation of the wires W1 and W2 in the groove 11G in the manufacturing of the coil component 1, which improves working efficiency. In addition, the tapered shape of the groove 11G makes a force directed toward the center of the groove 11G act on the wires W1 and W2, making it possible to position the wires W1 and W2 more reliably.

Figure 9:
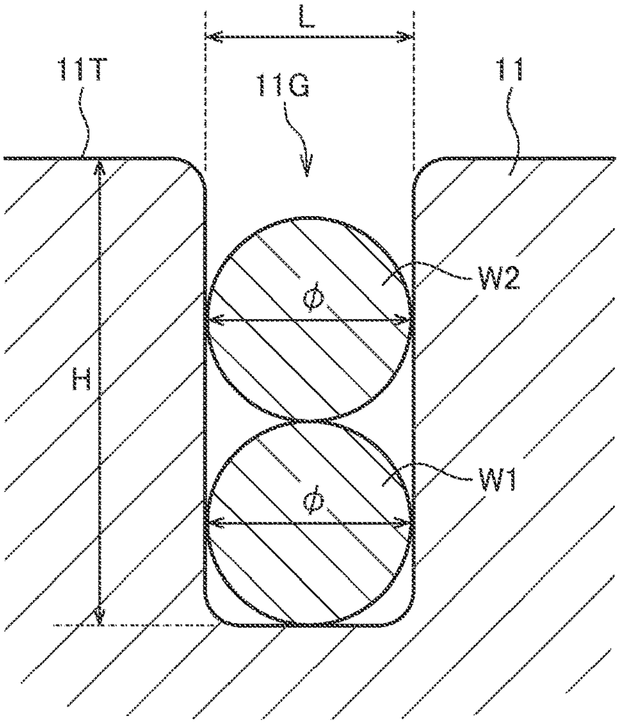
FIG. 9 is a schematic cross-sectional view illustrating a shape of the groove 11G according to a second modification.

Further, as in a second modification illustrated in FIG. 9, the wires W1 and W2 may be vertically stacked in the groove 11G. In this case, the depth H of the groove 11G is designed to be twice or slightly larger than the diameter ¢ of each of the wires W1 and W2, and the width L of the groove 11G is designed equal to or slightly larger than the diameter ϕ. Even in such a configuration, the wires W1 and W2 can be positioned in parallel to each other in the groove 11G.

Figure 10:
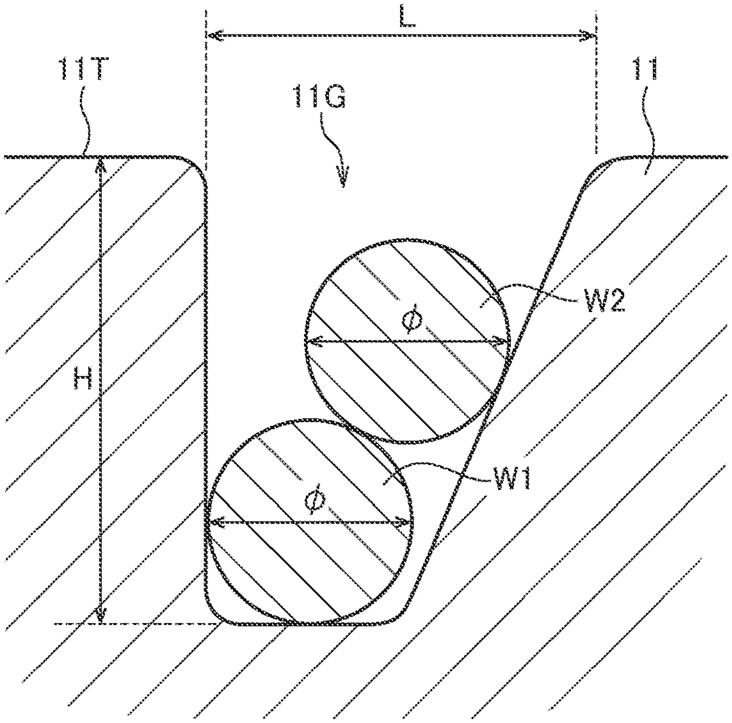
FIG. 10 is a schematic cross-sectional view illustrating a shape of the groove 11G according to a third modification.

Further, as in a third modification illustrated in FIG. 10, a configuration may be possible in which one or both of the side surfaces 11Gs of the groove 11G is inclined so as to be close to the other one or each other, the depth H of the groove 11G is designed to be twice or slightly larger than the diameter ϕ of each of the wires W1 and W2, and the width L of the groove 11G is designed equal to or more than the diameter ϕ and less than 2ϕ. With this configuration, the wire W2 positioned on the upper side is positioned by the inclined side surface 11Gs and the wire W1, making it possible to position the wires W1 and W2 in parallel to each other.

Figure 11:
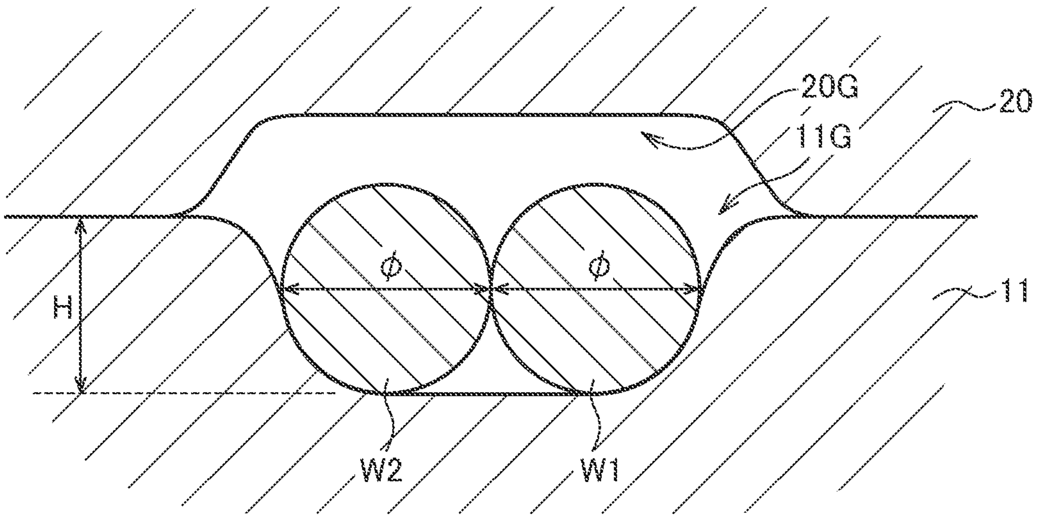
FIG. 11 is a schematic cross-sectional view illustrating a shape of the groove 11G according to a fourth modification.

Further, as in a fourth modification illustrated in FIG. 11, the depth H of the groove 11G may be designed smaller than the diameter ϕ of each of the wires W1 and W2. In this case, the wires W1 and W2 partially protrude from the groove 11G; however, the groove 20G of the plate-like core 20 is present at a position overlapping the groove 11G, so that the wires W1, W2 and the plate-like core 20 do not interfere with each other. Further, the groove 11G is formed shallow, making it possible to further suppress a reduction in volume of the drum-shaped core 10. When it is clear that the wires W1 and W2 do not protrude from the groove 11G at all, the groove 20G need not be formed in the plate-like core 20 even when manufacturing variation is taken into account.

The above description has been made focusing on the groove 11G. The groove 12G has the same shape and size as the groove 11G.

As described above, in the coil component 1 according to the present embodiment, the wires W1 and W2 are positioned in parallel to each other in the grooves 11G and 12G, so that a variation in characteristics such as an S parameter can be reduced. In addition, the grooves 11G and 12G are closed from above by the plate-like core 20, thereby preventing coming-off of the wires W1 and W2. Further, the grooves 11G and 12G are formed in substantially the centers of the flange parts 11 and 12 in the y-direction, so that the lengths of the wires W1 and W2 between the terminal electrodes E1, E2 (or E3, E4) and the winding core part 13 can be made substantially coincide with each other.

Second Embodiment

Figure 12:
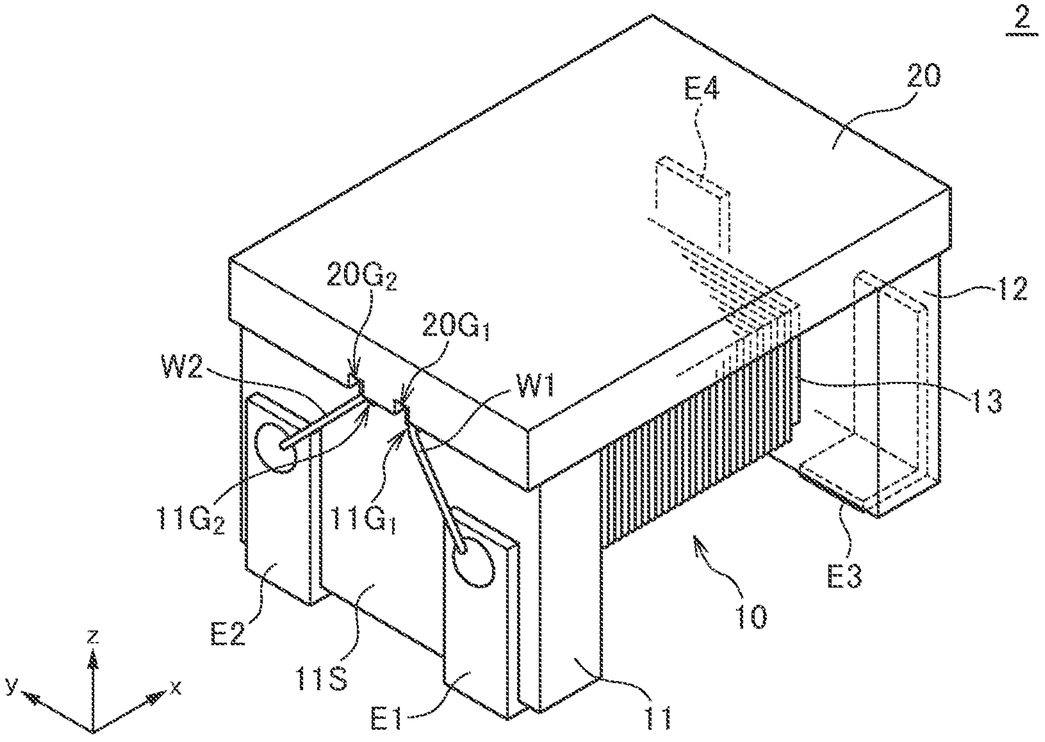
FIG. 12 is a schematic perspective view illustrating the outer appearance of a coil component 2 according to a second embodiment of the present invention.
Figure 13:
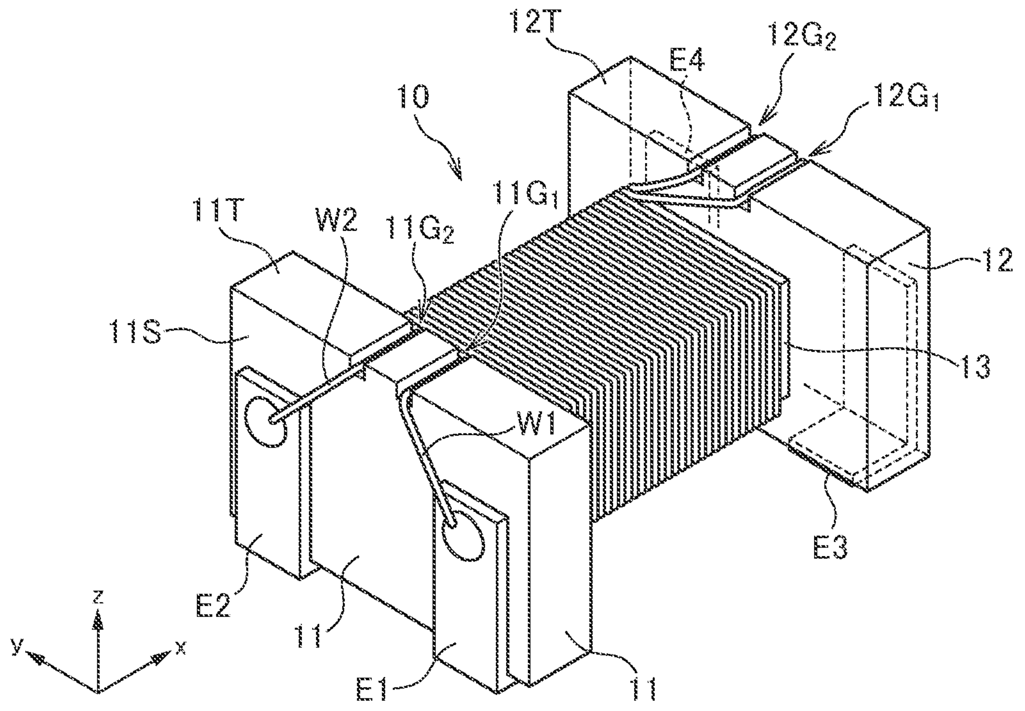
FIG. 13 is a schematic perspective view illustrating a state where the plate-like core 20 is removed from the coil component 2.
Figure 14:
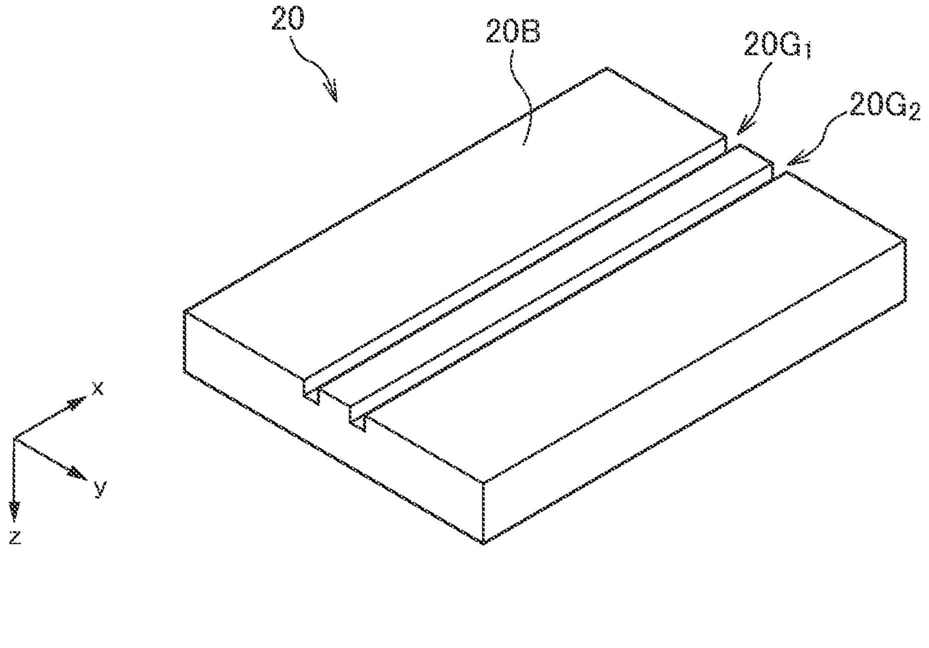
FIG. 14 is a schematic perspective view illustrating the outer appearance of the plate-like core 20 used in the second embodiment.

FIG. 12 is a schematic perspective view illustrating the outer appearance of a coil component 2 according to a second embodiment of the present invention. FIG. 13 is a schematic perspective view illustrating a state where the plate-like core 20 is removed from the coil component 2. FIG. 14 is a schematic perspective view illustrating the outer appearance of the plate-like core 20 used in the second embodiment.

As illustrated in FIGS. 12 and 13, in the coil component 2 according to the second embodiment, two grooves 11$G_1$ and 11$G_2$ are formed in the flange part 11, and two grooves 12$G_1$ and 12$G_2$ are formed in the flange part 12. A groove 20$G_1$ is formed in the surface 20B of the plate-like core 20 so as to overlap the grooves 11$G_1$ and 12$G_1$, and a groove 20$G_2$ is formed in the surface 20B so as to overlap the grooves 11$G_2$ and 12$G_2$. The leading portion of the wire W1 is accommodated in the groove 11$G_1$ and 12$G_1$, and the leading portion of the wire W2 is accommodated in the groove 11$G_2$ and 12$G_2$. Other configurations are the same as those of the coil component 1 according to the first embodiment, so the same reference numerals are given to the same elements, and overlapping description will be omitted.

In the present embodiment as well, the grooves 11$G_1$, 11$G_2$, 12$G_1$, 12$G_2$, 20$G_1$, and 20$G_2$ extend in the x-direction. Thus, in a state where the wires W1 and W2 are accommodated in the grooves 11$G_1$ and 12$G_1$ and grooves 11$G_2$ and 12$G_2$, respectively, the leading portions of the wires W1 and W2 are positioned in parallel to each other.

As described above, in the present embodiment, the wires W1 and W2 are accommodated in mutually different grooves, so that the wires W1 and W2 contact each other in neither groove. This makes it unlikely to cause twisting or tilting of the wires W1 and W2 in the groove due to variation in the operation of winding the wires W1 and W2.

Third Embodiment

Figure 15:
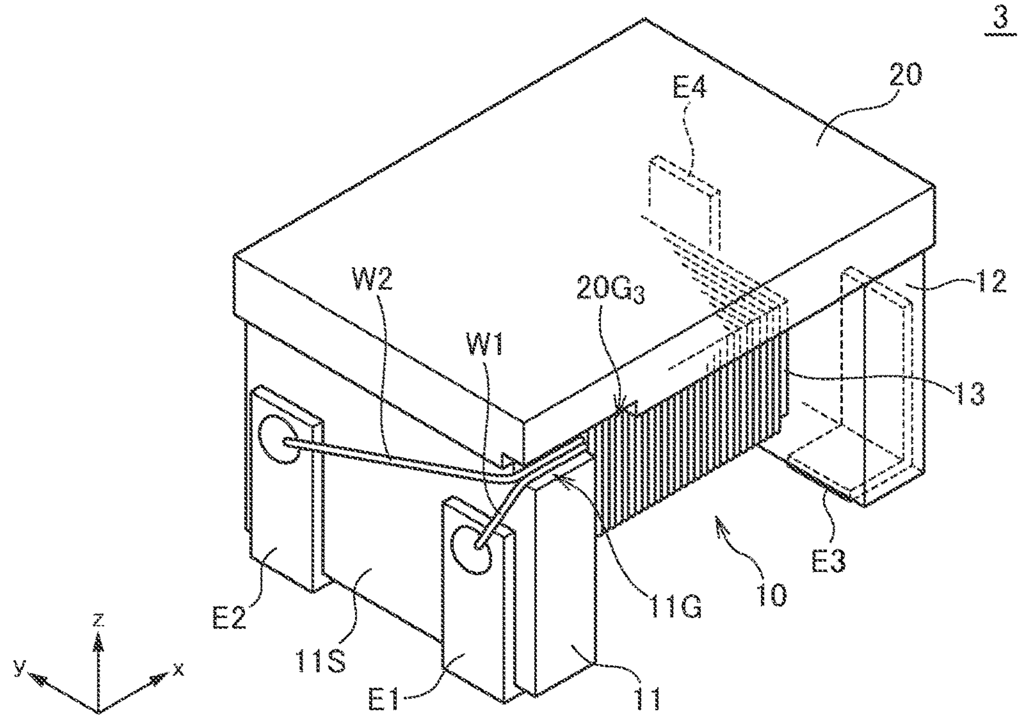
FIG. 15 is a schematic perspective view illustrating the outer appearance of a coil component 3 according to a third embodiment of the present invention.
Figure 16:
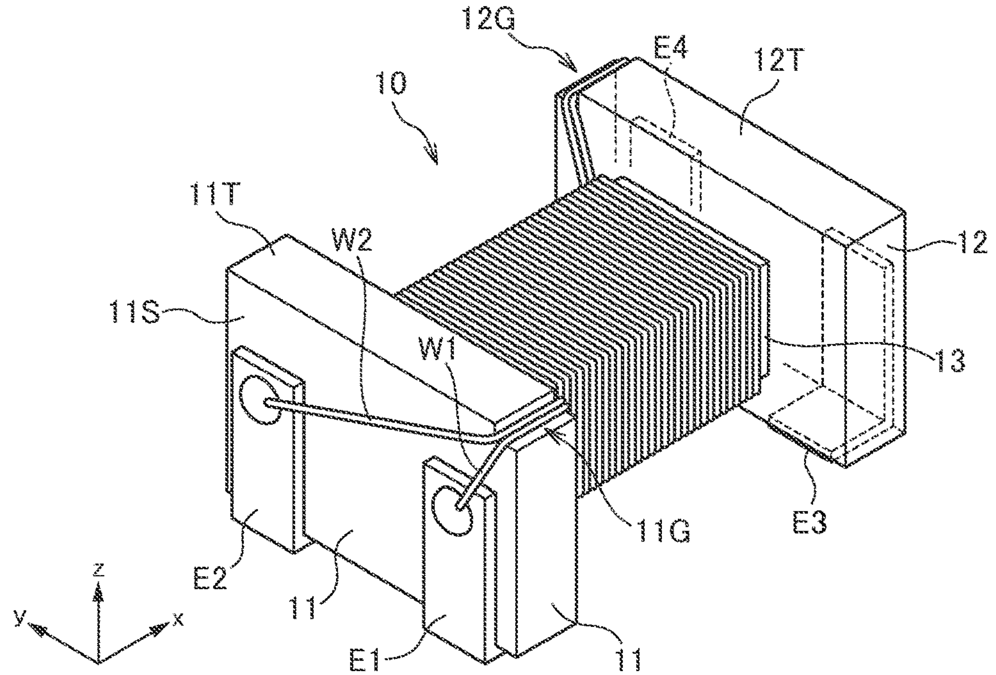
FIG. 16 is a schematic perspective view illustrating a state where the plate-like core 20 is removed from the coil component 3.
Figure 17:
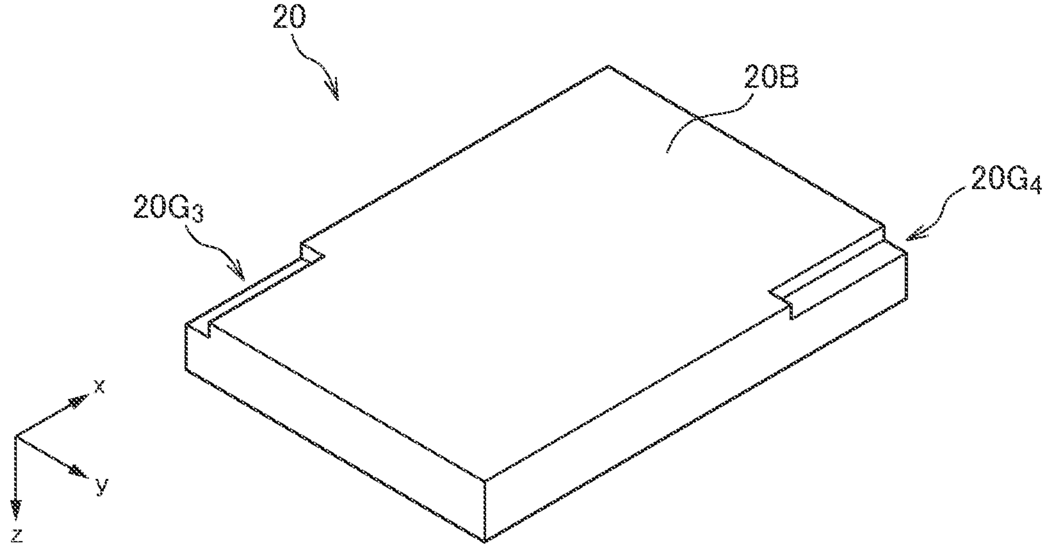
FIG. 17 is a schematic perspective view illustrating the outer appearance of the plate-like core 20 used in the third embodiment.

FIG. 15 is a schematic perspective view illustrating the outer appearance of a coil component 3 according to a third embodiment of the present invention. FIG. 16 is a schematic perspective view illustrating a state where the plate-like core 20 is removed from the coil component 3. FIG. 17 is a schematic perspective view illustrating the outer appearance of the plate-like core 20 used in the third embodiment.

As illustrated in FIGS. 15 and 16, in the coil component 3 according to the third embodiment, the groove 11G of the flange part 11 is offset in the negative y-direction, and the groove 12G of the flange part 12 is offset in the positive y-direction. Thus, the inner walls of the grooves 11G and 12G are exposed in the y-direction. On the other hand, grooves 20$G_3$ and 20$G_4$ are formed in the plate-like core 20 so as to overlap the grooves 11G and 12G, respectively. Other configurations are the same as those of the coil component 1 according to the first embodiment, so the same reference numerals are given to the same elements, and overlapping description will be omitted.

In the present embodiment as well, the grooves 11G, 12G, 20$G_3$, and 20$G_4$ extend in the x-direction. Thus, in a state where the wires W1 and W2 are accommodated in the grooves 11G and 12G, the leading portions of the wires W1 and W2 are positioned in parallel to each other.

According to the present embodiment, the grooves 11G and 12G are each formed at an area having a low magnetic flux density, so that it is possible to suppress a reduction in magnetic characteristics due to the formation of the grooves 11G and 12G in the drum-shaped core 10.

It is apparent that the present invention is not limited to the above embodiments, but may be modified and changed without departing from the scope and spirit of the invention.

What is claimed is:

1. A coil component comprising:

a drum-shaped core including a first flange part, a second flange part, and a winding core part positioned between the first and second flange parts;

a plurality of first terminal electrodes provided on the first flange part;

a plurality of second terminal electrodes provided on the second flange part;

a plurality of wires wound around the winding core part, each of the plurality of wires having a first end connected to an associated one of the first terminal electrodes, and having a second end connected to an associated one of the second terminal electrodes; and a plate-like core fixed to the first and second flange parts, wherein each of the first and second flange parts has a first groove formed in a surface facing the plate-like core, wherein the plurality of wires are positioned in parallel to each other in each of the first grooves formed in the first and second flange parts, and wherein a space factor of the plurality of wires in the first groove formed in each of the first and second flange part is 60% or more.

2. The coil component as claimed in claim 1, wherein the plate-like core has a second groove at a position overlapping the first grooves formed in the first and second flange parts.

3. The coil component as claimed in claim 2, wherein the second groove is greater in width than the first groove.

4. The coil component as claimed in claim 1, wherein the plurality of wires include first and second wires, wherein each of the first grooves formed in the first and second flange parts includes a first groove for accommodating the first wire and a second groove for accommodating the second wire, and wherein the first and second grooves extend in parallel to each other so as to position the first and second wires in parallel to each other.

5. The coil component as claimed in claim 4, wherein a lower section of each of the first and second wires is located in the first groove, and that an upper section of each of the first and second wires is located in the second groove.

6. The coil component as claimed in claim 1, wherein side surfaces of each of the first grooves formed in the first and second flange parts are inclined.

7. The coil component as claimed in claim 6, wherein the side surfaces of each of the first grooves are curved.

8. A coil component comprising:

a first core including a flange part having first and second surfaces and a winding core part extending in a first direction, the first surface of the flange part having a first groove between first and second sections thereof, the second surface of the flange part being perpendicular to the first direction;

a second core fixed to the first surface of the flange part so as to form a through hole by the first groove;

first and second terminal electrodes formed on the second surface of the flange part and arranged in a second direction perpendicular to the first direction;

a first wire wound around the winding core part and connected to the first terminal electrode via the through hole; and a second wire wound around the winding core part and connected to the second terminal electrode via the through hole, wherein the first and second wire contact each other inside the through hole, wherein the first groove has a bottom surface extending in the first and second directions, a first side surface located between the bottom surface and the first section of the first surface, and a second side surface located between the bottom surface and the second section of the first surface, wherein the first wire contacts the bottom surface, the first side surface, and the second wire inside the through hole, and wherein the second wire contacts the bottom surface, the second side surface, and the first wire inside the through hole.

9. The coil component as claimed in claim 8, wherein the second core has a second groove overlapping the first groove, and wherein the through hole is formed by the first and second grooves.

10. The coil component as claimed in claim 9, wherein a depth of the first groove is smaller than a diameter of each of the first and second wires such that a lower section of each of the first and second wires is located in the first groove, and that an upper section of each of the first and second wires is located in the second groove.

11. The coil component as claimed in claim 9, wherein the second groove is greater in width in the second direction than the first groove.

12. The coil component as claimed in claim 8, wherein the first side surface is inclined with respect to the bottom surface such that an angle between the bottom surface and the first side surface is an obtuse angle.

13. The coil component as claimed in claim 12, wherein the second side surface is inclined with respect to the bottom surface such that an angle between the bottom surface and the second side surface is an obtuse angle.

14. The coil component as claimed in claim 8, wherein each of the first and second side surfaces of the first groove is curved.

15. A coil component comprising:

a first core including a flange part having first and second surfaces and a winding core part extending in a first direction, the first surface of the flange part having first and second grooves extending in parallel with each other in the first direction, the second surface of the flange part being perpendicular to the first direction;

a second core fixed to the first surface of the flange part so as to form a first through hole by the first groove and a second through hole by the second groove;

first and second terminal electrodes formed on the second surface of the flange part and arranged in a second direction perpendicular to the first direction;

a first wire wound around the winding core part; and a second wire wound around the winding core part, wherein the first wire includes a first section located inside the first groove and a second section located on the second surface and connected to the first terminal electrode, and wherein the second wire includes a third section located inside the second groove and a fourth section located on the second surface and connected to the second terminal electrode.

16. The coil component as claimed in claim 15, wherein the second core has a third groove overlapping the first groove and a fourth groove overlapping the second groove, wherein the first through hole is formed by the first and third grooves, and wherein the second through hole is formed by the second and fourth grooves.

17. The coil component as claimed in claim 16, wherein the third and fourth grooves extend in parallel with each other in the first direction.

18. The coil component as claimed in claim 17, wherein each of the third and fourth grooves is greater in length in the first direction than each of the first and second grooves.

19. The coil component as claimed in claim 16, wherein the first section of the first wire has a lower section located in the first groove and an upper section located in the third groove, and wherein the third section of the second wire has a lower section located in the second groove and an upper section located in the fourth groove.

* * * * *